Sept. 9, 1969　　　　D. L. GINN　　　　3,465,998

RESTRAINT LATCH

Filed April 28, 1967

INVENTOR.
DAVID L. GINN

BY

Jack C. Munro

-AGENT-

United States Patent Office 3,465,998
Patented Sept. 9, 1969

3,465,998
RESTRAINT LATCH
David L. Ginn, Garden Grove, Calif., assignor, by mesne assignments, to McDonnell Douglas Corporation, Santa Monica, Calif., a corporation of Maryland
Filed Apr. 28, 1967, Ser. No. 634,613
Int. Cl. A62b 35/00
U.S. Cl. 248—361                                  3 Claims

ABSTRACT OF THE DISCLOSURE

A latch applicable for use with cargo handling apparatus and specifically to restrain vertical movement of a cargo handling pallet. The latch includes spring biased restraining arms which automatically retract to permit passage of the pallet during pallet movement.

Background of invention

In the transporting of cargo in vehicles it is usually a must that the cargo be restrained against all movement. All vehicles whether a truck, train, ship or plane, that is designed to carry cargo, has some apparatus included therein to (1) securely retain the cargo against all movement during transporting, and (2) to facilitate ease of loading and unloading of the cargo at the same time. In aircraft the problem of loss of time in the loading and unloading is particularly acute. It is imperative that minimum time be used in the loading and unloading operations.

Most present cargo handling system are designed to use a pallet as the basic load supporting surface. Usually the load is secured to the pallet and the pallet in turn is restrained within the vehicle. The pallet restraint apparatus includes a longitudinal movement restraint, a transverse movement restraint and a vertical movement restraint. A common type of transverse movement restraint is a pair of longitudinal side rails, one on each side of the pallet. Usually, these rails include a protruding lip to overlap the edge of the pallet thereby providing the vertical restraint. However, fixed side rails are not adequate as not all pallets are uniform in size. Pallet size depends upon the particular type of vehicle and the cargo to be transported. It is common for pallets to vary in width from 88 inches to 125 inches. To accommodate such a variance in pallet width it was necessary that the side rails be capable of being relocated to different positions, usually a track and detent arrangement is employed.

Further complications arose with respect to the protruding lip of the side rails. It is common for pallets to include cargo net attachment fittings. The cargo net is one means of holding the cargo on the pallet. The fittings usually extend vertically upward from the top pallet surface and the net is fastened thereto. Some pallets have fittings mounted directly adjacent the edge of the pallet and as a result the fittings interfere with the protruding lip of the side rails. Once the pallet was in position, a series of removable protruding lips could be effectively placed to avoid interference with a fitting. However, upon moving of the pallet, the removable protruding lips have to be individually removed from their operative positions.

As is apparent from above, when employing side rails with removable protruding lips, several distinct movements would be necessary in removing and relocating the protruding lips to effect the transporting of a single pallet. Assuming there are four such lips per pallet, all four would have to be removed and relocated before the pallet is positioned, and likewise for pallet embarkment. In one airplane it is not uncommon to support twelve to twenty-four pallets. All the necessary separate operations associated with removing the protruding lips to load and unload an airplane is quite time consuming. In actual practice, if some form of self actuated protruding lip could be used which would be actuatable by the cargo pallet, the loading and unloading time could be decreased by as much as thirty percent.

Summary

The apparatus of this invention is to provide a side restraint for a cargo pallet which includes a vertical restraining lip which is retractable automatically upon being contacted by any portion of the pallet or cargo net. Upon passage of the interfering portion of the pallet or net, the retracted lip is biased to automatically move back to the operative position.

Specifically, the vertical restraining lip of this invention comprises a single disc member. The disc is fixed to a shaft with the shaft being rotatable within a carriage. The carriage is in turn pivotally mounted to the relatively fixed side restraint, the carriage being spring biased to place the disc in the restraining position i.e., the disc to overlap the edge of the pallet and prevent vertical pallet movement. If during pallet movement some portion of the pallet or the load contacts the disc, the disc will be moved from the overlaping position against the action of the spring bias to allow passage of the pallet. The disc rolls over the interference similar to a wheel with the shaft functioning as the axle. In this manner the vertical restraint is automatically retracted by interference itself to be non-interfering.

The most apparent advantage of this invention is the eliminating of the relocating requirement of the fixed vertical restraint during pallet movement. However, other important objects are to be noted such as no separate actuating mechanism is necessary as the vertical restraining disc actuates itself. Also, the vertical restraining disc is retractable with pallet movement in either direction. The device may be placed in an inaccessable location because it does not require manual actuation. Other objects and features of the invention will become apparent as the description proceeds, particularly when taken in conjunction with the accompanying drawings illustrating the invention.

Description of the shown embodiment

Figure 1:
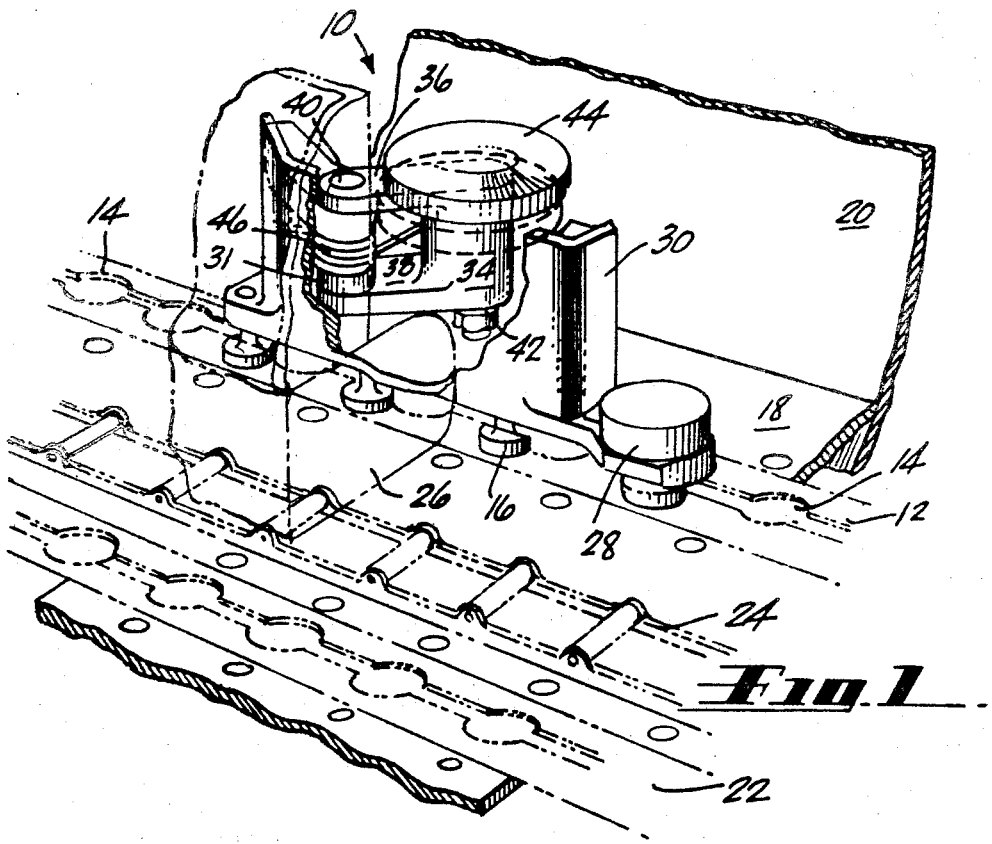
FIGURE 1 is a perspective view of the restraining latch of this invention in its intended environment.
Figure 2:
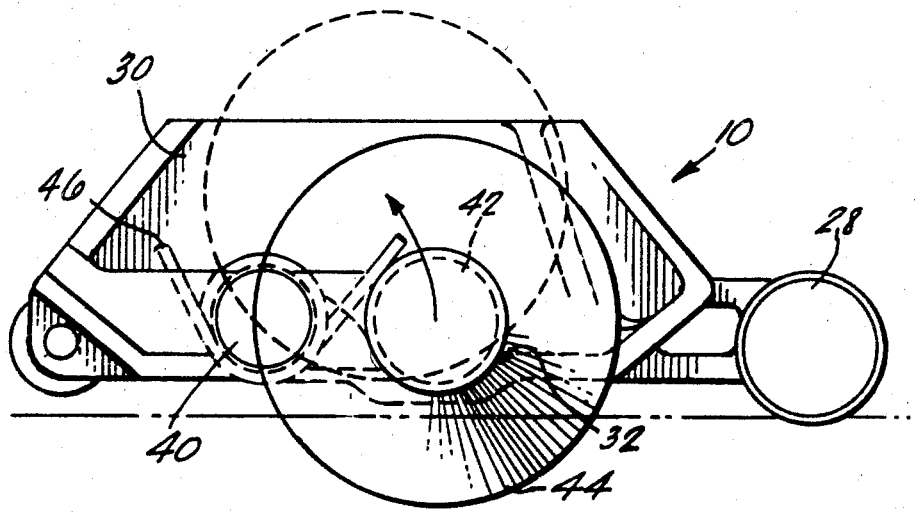
FIG. 2 is a plan view of the latch of this invention shown in FIG. 1.

Referring particularly to the drawing, in FIG. 1, there is shown a latch 10 of this invention mounted within a track 12. The track 12 is of the common type employed in air craft having a series of equally spaced notches 14 which is to receive studs 16. The track 12 is fixed to the floor 18 of the aircraft fuselage 20. Usually more than one track 12 is employed there being also a track 22 shown laterally spaced from track 12. Track 12 is to accommodate a greater width pallet than track 22, as for example, track 12 is for a 125 inch pallet and track 22 is for a 88 inch pallet. Roller trays 24 are also fixed to floor 18 and are to low frictionally support pallet 26. The latch 10 is removably held within track 12 by means of plunger 28. The spacing of the plunger 28 from the nearest stud 16 is approximately one-half the distance between the studs 16, thereby, when plunger 28 is located in a notch 14 the studs are positioned between the notches 14 resulting in a restraining of vertical movement of the latch 10. It is to be understod that the track described in conjunction with this invention is for illustrative purposes only. Any type of track and cooperating locking structure may be used without departing from the scope of this invention.

Specifically, the latch 10 of this invention includes a housing 30 to which the studs 16 are attached on the underside thereof. The top side of the housing 30 extends vertically a certain distance. Vertically is to be defined as extending perpendicular from the aircraft floor and the certain distance is defined to be slightly greater than the height of the pallet employed. Housing 30 has a slight indentation 32, the reason therefore will become apparent as the description proceeds. The front side of the housing 30 is to contact the pallet 26 and act as the lateral restraint therefore. Mounted on the back side of the housing 30 adjacent the front side is a carriage 34. Carriage 34 is bifurcated at one side forming arms 36 and 38. Arms 36 and 38 are pivotally connected to housing 30 in a hinge joint by means of hinge pin 40. The main body of the carriage 34 includes an elongated aperture which is substantially parallel to the center line of rotation of the hinge joint. Within said aperture a shaft 42 is rotatably held. Fixed to the shaft 42 is a disc 44 which rests on the upper surface of carriage 34. A torsion spring 46 is wound about hinge pin 40 which biases the carriage 34 to a forward position in contact with housing 30. In this position the main body portion of the carriage 34 rests within indentation 32. With the carriage 34 in this forward position, approximately one-third of the disc 44 extends beyond the front side of the carriage 30. As a result with an edge of a pallet located directly adjacent the front side of the housing 30, the disc 44 will overlap the edge of the pallet thereby restraining the pallet against vertical movement.

It is to be noted that when an upward vertical force from the pallet is exerted upon the disc 44, the disc tends to become canted one or two degrees. This canting results in the creation of a component of force (from the vertical force) which tends to laterally move the disc to the inoperative or non-pallet overlap position. As such a lateral component of force is undesirable, the carriage 34 is designed to form a frictional brake with the housing 30 at the hinge joint. For this purpose the area of the housing 30 which is to contact the arm 38 of the carriage 34 is designed larger than necessary. As a result when the vertical force is exerted upon the disc 44 the arm 38 is forcibly held in contact with the hinge joint portion of the housing 30. The friction of the contaction between the hinge point portion 31 of the housing 30 and the arm 38 of the carriage 34 tends to prevent rotation movement of the arm 38 relative to the hinge point portion 31 of the housing 30. This contaction acts like a disc brake to tend to prevent rotation movement of carriage 34 thereby also preventing lateral movement thereof.

The operation of this invention is felt to be readily apparent, however, a brief description of its operation will now be given. With the latch 10 of this invention installed and functioning to restrain movement of a pallet, the disc 44 is positioned to overlap the edge of the pallet. When it is desirable to move the pallet, there may be a fitting on the pallet or some portion of the pallet load which will interfere with the disc 44. Once this interference contacts the disc 44, as the pallet is continually moved, the disc 44 proceeds to "roll over" the interference. During this rolling movement the disc 44 also moves laterally against the bias of spring 46 to permit complete passage of the interference. Once the interference has passed, the disc 44 assumes the overlapping position with the pallet by means of the spring 46.

Having thus described this restraint latch as to one embodiment, it is to be understood that the invention is not limited thereto, as many variations will be readily apparent to those skilled in the art and the invention is to be given its broadest possible interpretation within the terms of the following claims.

I claim:

1. In combination with a cargo handling system for temporarily securing palletized cargo against movement, a restraint latch for preventing substantial transverse movement and vertical movement of the loaded pallet comprising:

a housing, a front side of said housing forming the restraint for the transverse movement of said pallet;

a carriage being rotatably supported upon said housing and forming a first axis of rotation therewith, said carriage being biased by a spring means to a first position; and a disc being rotatably supported upon said carriage and forming a second axis of rotation therewith, said second axis being substantially parallel and displaced from said first axis, whereby when said carriage is located in said first position a portion of said disc extends beyond said front side of said housing and overlaps the edge of said pallet which is located adjacent to said front side.

2. A restraint latch as defined in claim 1 wherein: said spring means comprises a torsion spring.

3. A restraint latch as defined in claim 1 wherein: the connection between said carriage and said housing forms a brake tending to prevent rotation of said carriage when said disc is preventing vertical pallet movement.

References Cited

UNITED STATES PATENTS

| | | | |
|---|---|---|---|
| 2,071,355 | 2/1937 | Norbom | 105—366 |
| 3,093,092 | 6/1963 | Martin et al. | |
| 3,182,608 | 5/1965 | Mollon | 105—366 |
| 3,306,234 | 2/1967 | Hansen et al. | |
| 3,348,502 | 10/1967 | Burns et al. | |
| 3,357,372 | 12/1967 | Bader. | |
| 3,377,040 | 4/1968 | Hansen | 248—119 |

FRANCIS K. ZUGEL, Primary Examiner

U.S. Cl. X.R.

105—368, 369